(12) United States Patent
Girondi

(10) Patent No.: US 9,347,407 B2
(45) Date of Patent: May 24, 2016

(54) MANIFOLD ELEMENT FOR A FILTERING CARTRIDGE

(71) Applicant: UFI FILTERS S.P.A., Porto Mantovano (IT)

(72) Inventor: Giorgio Girondi, Mantova (IT)

(73) Assignee: UFI FILTERS S.P.A., Porto Mantovano (MN) (IT)

( * ) Notice: Subject to any disclaimer, the term of this patent is extended or adjusted under 35 U.S.C. 154(b) by 126 days.

(21) Appl. No.: 14/347,844

(22) PCT Filed: Sep. 17, 2012

(86) PCT No.: PCT/IB2012/001896
§ 371 (c)(1),
(2) Date: Mar. 27, 2014

(87) PCT Pub. No.: WO2013/050848
PCT Pub. Date: Apr. 11, 2013

(65) Prior Publication Data
US 2014/0230384 A1      Aug. 21, 2014

(30) Foreign Application Priority Data

Oct. 5, 2011 (IT) .............................. RE2011A0078

(51) Int. Cl.
*B01D 46/00* (2006.01)
*F02M 35/104* (2006.01)
(Continued)

(52) U.S. Cl.
CPC ............ *F02M 35/104* (2013.01); *B01D 46/002* (2013.01); *B01D 46/0005* (2013.01); *B01D 46/2411* (2013.01); *B01D 46/2414* (2013.01); *B01D 46/4227* (2013.01); *F02M 35/0201* (2013.01); *F02M 35/0215* (2013.01); *F02M 35/02416* (2013.01); *F02M 35/02483* (2013.01); *F02M 35/10334* (2013.01); *B01D 2265/028* (2013.01); *B01D 2279/60* (2013.01)

(58) Field of Classification Search
CPC .. B01D 35/30; B01D 35/153; B01D 46/0002; B01D 46/0003; B01D 46/24; B01D 46/0005; B01D 46/0024; B65D 8/04; B05D 41/06
USPC ................. 55/385.3, 498, 341.4; 123/184.53, 123/198 E; 210/188, 443; 220/284, 293
See application file for complete search history.

(56) References Cited

U.S. PATENT DOCUMENTS 5,676,273 A * 10/1997 Jonkers .............. B65D 43/0225
                                                                  220/284
5,730,769 A *  3/1998 Dungs ................ B01D 46/0024
                                                                  123/198 E (Continued)

FOREIGN PATENT DOCUMENTS

DE        102005019672 A1    11/2006
DE        202007011096 U1    12/2008
GB             1367701 A      9/1974

*Primary Examiner* — Duane Smith
*Assistant Examiner* — Minh-chau Pham
(74) *Attorney, Agent, or Firm* — Volpe and Koenig, P.C.

(57) ABSTRACT

A manifold element (210) for a filtering cartridge (200) includes a shaped shell (215) provided with an internal volume (220) and a plurality of access ports (225, 230) communicating with said internal volume, among which a plurality of first access ports (225) and at least one second access port (230). Each of the first access ports (225) is adapted to be coupled with a respective filtering material element (205) so as to support it and be occluded thereby.

18 Claims, 9 Drawing Sheets

(51) Int. Cl.
*B01D 46/24* (2006.01)
*B01D 46/42* (2006.01)
*F02M 35/10* (2006.01)
*F02M 35/02* (2006.01)
*F02M 35/024* (2006.01)

(56) References Cited

U.S. PATENT DOCUMENTS

| | | | | |
|---|---|---|---|---|
| 5,755,842 A * | 5/1998 | Patel | ................. | B01D 46/0005 55/330 |
| 5,800,581 A * | 9/1998 | Gielink | ............. | B01D 46/002 55/385.3 |
| 5,803,939 A * | 9/1998 | Huning | ................ | B01D 46/002 55/341.4 |
| 5,876,600 A * | 3/1999 | Matsubara | ........... | B01D 35/153 210/443 |
| 5,948,246 A * | 9/1999 | Zuk, Jr. | ................ | B01D 29/606 210/188 |
| 6,039,778 A * | 3/2000 | Coulonvaux | ........... | B01D 46/24 55/498 |
| 6,051,042 A * | 4/2000 | Coulonvaux | ........... | B01D 46/24 55/498 |
| 6,402,798 B1 * | 6/2002 | Kallsen | ................. | B01D 35/30 220/293 |
| 8,409,312 B2 * | 4/2013 | Gorg | ................. | B01D 46/0063 123/198 E |
| 8,839,756 B2 * | 9/2014 | Ozaki | ............. | F02M 35/10091 123/184.53 |
| 2007/0271885 A1 | 11/2007 | Rieger et al. | | |
| 2012/0047856 A1 * | 3/2012 | Khami | ............... | B01D 46/0002 55/385.3 |

* cited by examiner

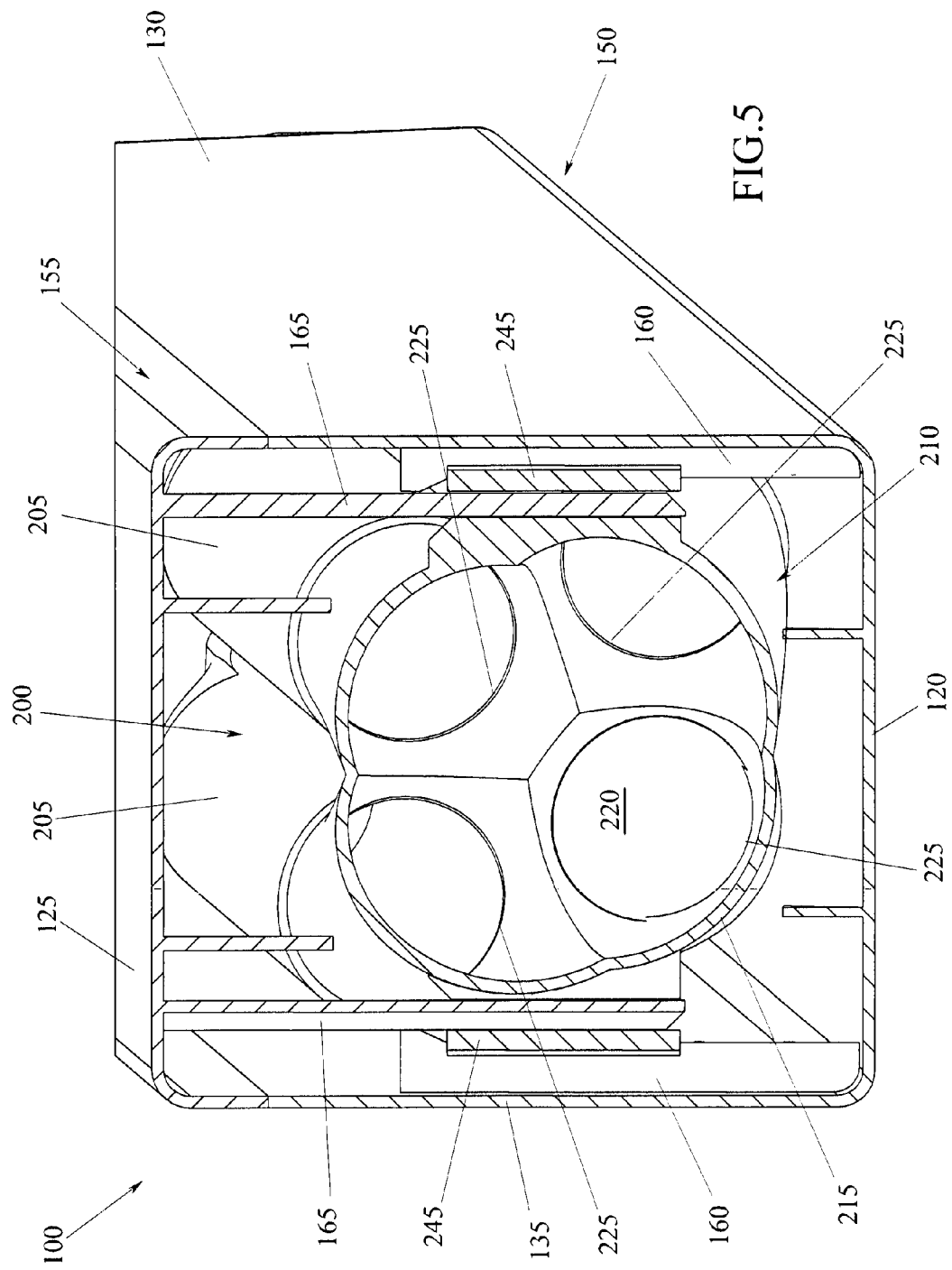

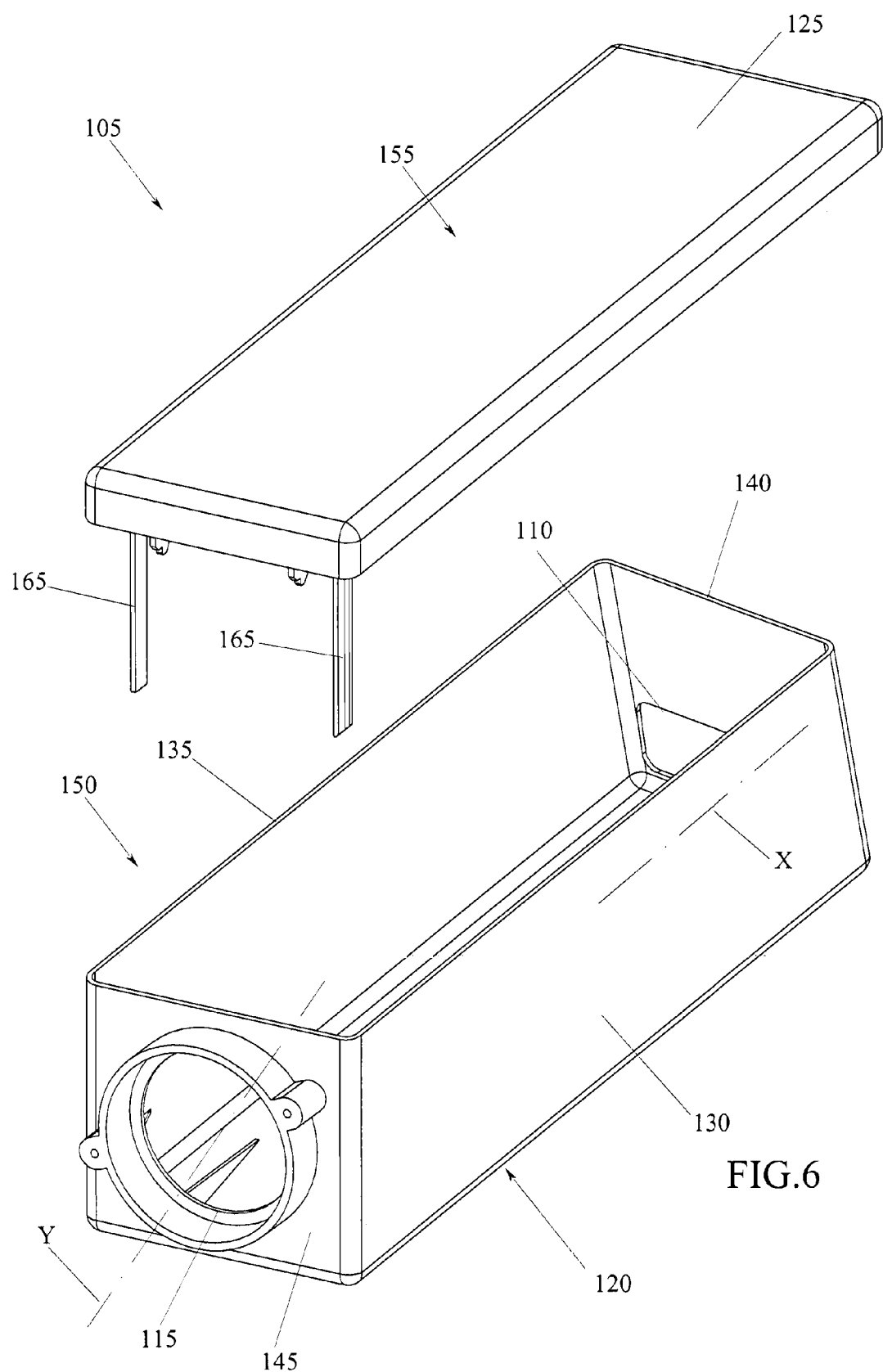

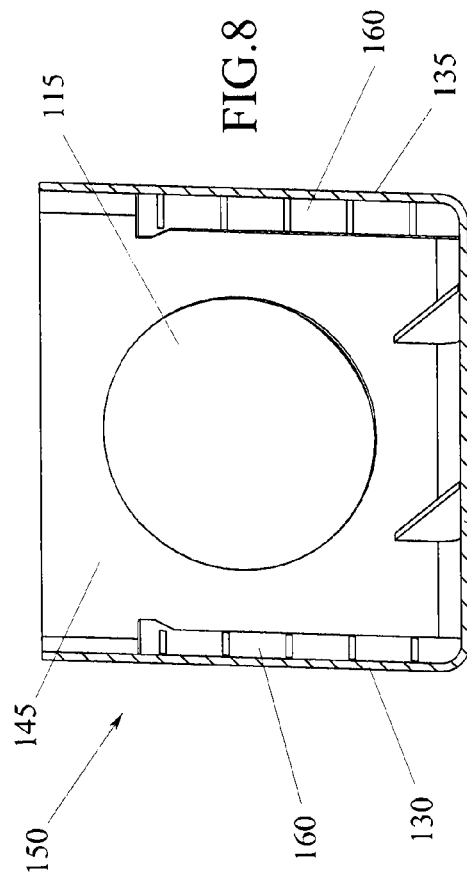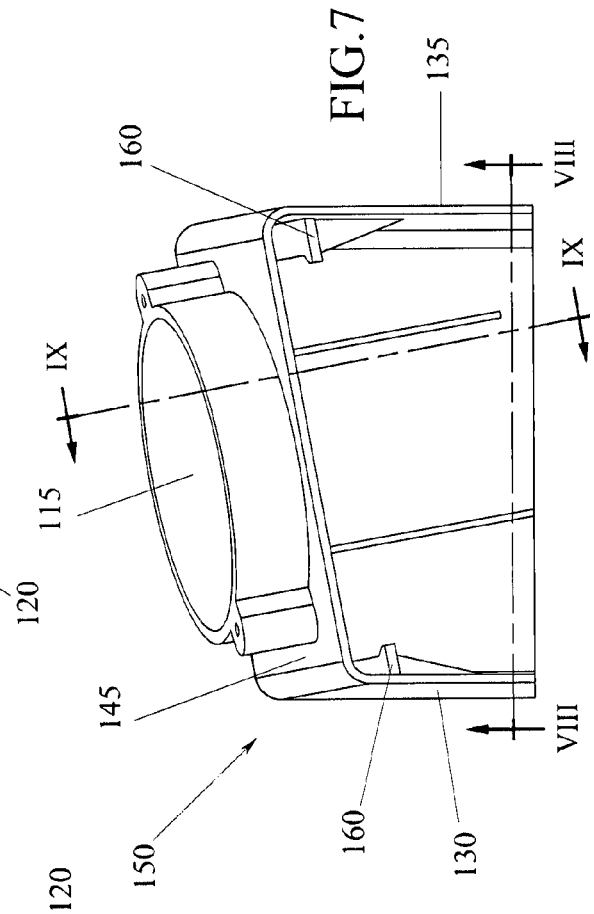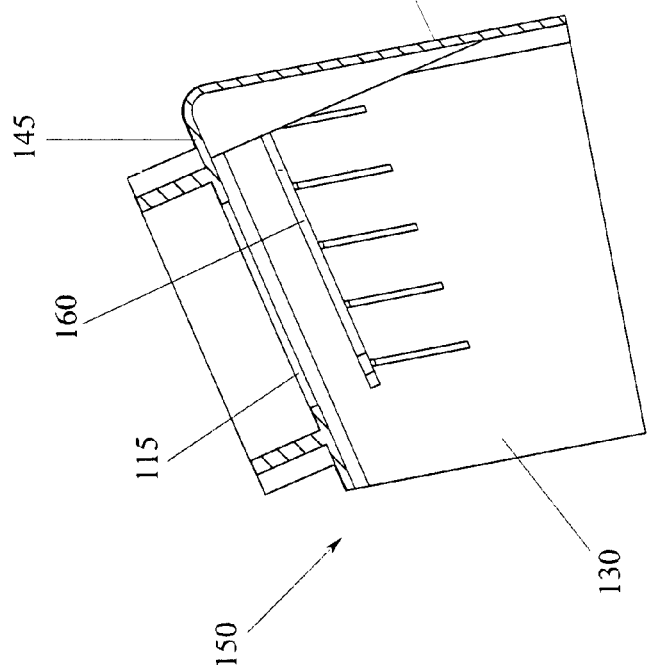

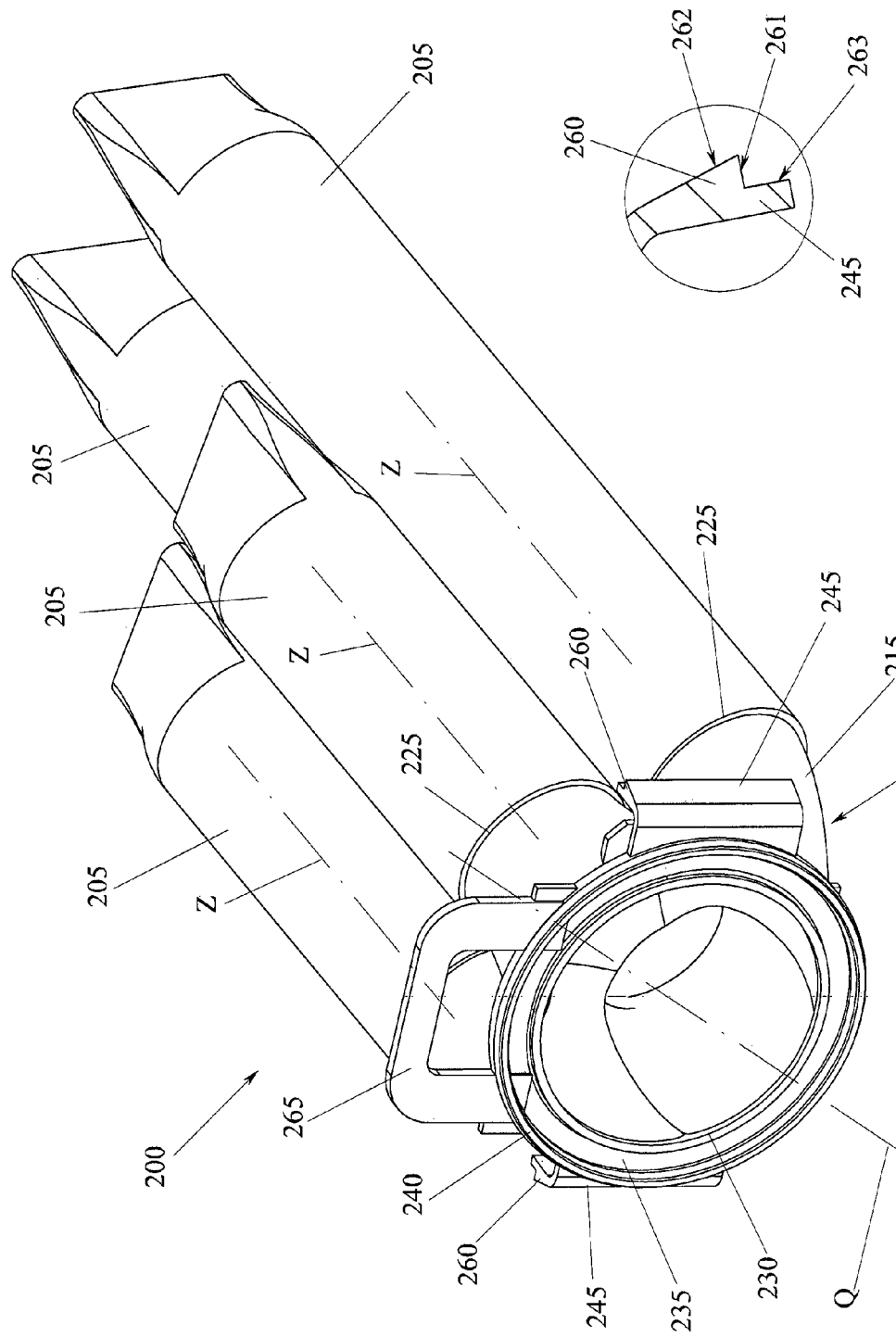

MANIFOLD ELEMENT FOR A FILTERING CARTRIDGE

TECHNICAL FIELD

The present invention generally refers to filtering fluids, especially the filtration of motor vehicle fluids, in particular including the filtration of air that is taken in by an internal combustion engine.

BACKGROUND ART

As known, the air taken in by an internal combustion engine is usually subjected to a filtration stage aimed at purifying it from the solid particles in suspension, typically dusts of various types, to prevent the latter from reaching the engine combustion chambers. This filtration stage typically occurs by means of a special filtering assembly, which is positioned along the intake conduit of the internal combustion engine, upstream of the intake manifold and of the turbocharger if present.

The filtering assembly schematically comprises an outer casing, usually referred to as filter box, which is provided with an inlet for the air to be filtered and an outlet for the filtered air, and a filtering cartridge received within said filter box for filtering the air that flows from the inlet towards the outlet. The filtering cartridge comprises at least one filtering material element, for example based on cellulose or polymeric material, and at least one plate for supporting said filtering material element. The support plate is hooked to the filter box so that the filtering material element is adapted to divide the internal volume thereof into two separate chambers, among which a first chamber communicating with the inlet and a second chamber communicating with the outlet. Thus, the air flowing from the inlet towards the outlet of the filter box is forced to traverse the filtering material element, which withholds the solid particles in suspension. Given that said solid particles progressively obstruct the filtering material element, it is commonly provided for that the filtering cartridge be removed from the filter box, so as to replace it when the filtering material element is entirely clogged.

One of the main needs related to this type of filtering assemblies lies in providing high accumulation capacity filtering cartridges, i.e. capable of withholding a large amount of solid particles before it is clogged, so as to guarantee a high useful life and thus reduce replacement interventions.

In order to address these problems filtering cartridges comprising a plurality of filtering material elements, which are arranged so as to be traversed parallel by the air flowing from the inlet towards the outlet of the filter box were proposed. Considering the use of the same filtering material, these filtering cartridges actually reveal the advantage of considerably increasing the filtering surface through which the air can pass, and hence the filtering surface on which the solid particles in suspension can accumulate.

Though being advantageous in terms of accumulation capacity, this type of filtering cartridges reveal the drawback of being quite complex to mount and being quite cumbersome. The mounting difficulty is disadvantageous in that it makes the interventions of replacing the filtering cartridge—when clogged—difficult and slow thus also increasing the costs thereof. The large overall dimension is disadvantageous in that it increases the overall dimensions of the filtering assembly which, on the contrary, should be generally small in size and/or meet precise dimensional and geometric requirements that are established by vehicle manufacturers, depending on the distribution of the volumes of all components within the vehicle engine compartment.

DISCLOSURE OF THE INVENTION

An object of the present invention is to overcome or at least considerably reduce the mentioned drawbacks of the known art, through a solution that is simple, rational and inexpensive.

Such objects are attained by the characteristics of the invention indicated in the independent claims. The dependent claims outline preferred and/or particularly advantageous aspects of the invention.

In particular, an embodiment of the invention provides a manifold element for a filtering cartridge, which comprises a shaped shell provided with an internal volume and a plurality of access ports communicating with said internal volume, among which a plurality of first access ports and at least one second access port, in which each of said first access ports is adapted to be coupled with a respective filtering material element so as to support it and be occluded thereby.

Depending on the direction according to which the fluid is intended to traverse filtering material elements, the first access ports of the manifold element may serve as inlets for the fluid to be filtered and the second access port may serve as an outlet for the filtered fluid, or vice versa.

Due to the characteristics outlined above, the invention thus provides a component for a filtering cartridge which is adapted to serve both the function of supporting filtering material elements and the function for collecting and conveying the fluid which traverses the filtering cartridge. Thus, said component simplifies the installation and removal of the filtering cartridge with respect to the relative filter box, in that it serves as a common support that allows simultaneous mounting/demounting of all filtering material elements through a single operation and further allows a better exploitation of the space available within the filter box. Actually, the position of the filtering material elements will no longer be strictly bound to the inlet and outlet position of the filter box, given that the manifold element according to the invention may be shaped so as to serve as a fitting.

Regarding this, an aspect of the invention provides for that the second access port of the shaped shell may have a central axis inclined with respect to the central axes of the first access ports, which may be possibly parallel to each other.

Thus, the filtering material elements may be advantageously positioned within the filter box according to an inclined orientation with respect to the inlet and/or outlet of the fluid, thus contributing to the best exploitation of the available space.

According to another aspect of the invention, the manifold element may comprise an annular gasket surrounding said second access port.

Thus, regardless of the fact that the second access port is placed in connection with the inlet or the outlet of the filter box, said annular gasket can advantageously guarantee the airtight sealing of such connection, thus forcing all the fluid to traverse the filtering material elements. Furthermore, given that the annular gasket is associated to the manifold element, such solution makes the mounting of the filtering cartridge in the filter box easier and quicker, and also guarantees that the annular gasket be replaced each time the filtering cartridge is replaced.

An aspect of the invention provides for that said annular gasket can be obtained in a single piece with the shaped shell, for example through a co-moulding process.

This solution has the advantage of reducing the number of components required to be mounted during the assembly of the manifold element hence the filtering cartridge. However it should be pointed out that said gasket can also be obtained as a separate body with respect to the shaped shell.

According to another aspect of the invention, the shaped shell is provided with hook means, which are adapted to provide a snap-hook-coupling with corresponding abutment means arranged within a relative filter box, i.e. a casing adapted to receive the filtering cartridge.

This solution has the advantage of making both the installation and removal of the filtering cartridge with respect to the filter box particularly easy and quick.

An aspect of the invention particularly provides for that said hook means comprise at least one pair of flexible fins positioned on sides diametrically opposite with respect to a central axis of the second access port, which are configured so as to be able to bend in a radial direction with respect to said central axis and are separately provided with at least one tooth radially projecting outwards.

This aspect of the invention has the advantage of providing a particularly simple and reliable solution for providing the snap-coupling between the manifold element and the relative filter box.

Another aspect of the invention provides for that said flexible fins and the relative projecting teeth be configured so as to allow the snap coupling with the abutment element, following a movement regarding the manifold element in a preset coupling direction, and so as to allow releasing said coupling, through a relative movement of the manifold element in a direction orthogonal to said coupling direction.

According to a further aspect of the invention, the manifold element may comprise a handle.

Said handle has the advantage lying in the fact that it can be gripped by an operator, so as to as to facilitate the operations of hooking/removing the filtering cartridge to/from filter box.

Furthermore, the invention provides a filtering cartridge comprising the manifold element outlined above and a plurality of filtering material elements, each of which is coupled to one of respective first access ports of the shaped shell so as to occlude it.

This embodiment of the invention substantially attains the same advantages mentioned previously, and in particular simplifying the mounting of the filtering cartridge and improving the exploitation of the spaces within the filter box.

According to an aspect of the invention, each of said filtering material elements has a tubular shape with a closed end.

This configuration of the filtering material elements has the advantage of providing a large filtering surface for the fluid considering the relatively small dimensions, as well as the advantage of not requiring other elements for supporting the filtering elements besides the manifold element, thus simplifying the mounting of the filtering cartridge and the installation thereof in the relative filter box.

Lastly, the invention provides a filtering assembly comprising an outer casing (filter box) provided with un inlet for the fluid to be filtered and an outlet for the filtered fluid, and the filtering cartridge outlined above arranged to divide the internal volume of said casing into two separate chambers, among which a first chamber communicating with the inlet of the fluid to be filtered and a second chamber communicating with the outlet of the filtered fluid.

Also this embodiment of the invention substantially attains the same advantages mentioned previously, and in particular the advantage of simplifying the mounting of the filtering assembly and improving the exploitation of the spaces within the filter box, hence allowing reducing the overall dimensions of the filtering assembly.

According to an aspect of the invention, said outer casing comprises a removable cover for introducing and removing the filtering cartridge.

This solution has the advantage of allowing replacing the filtering cartridge without requiring demounting the entire filtering assembly.

According to an aspect of the invention, said removable cover comprises safety means adapted to maintain the hook means of the manifold element coupled with the corresponding abutment elements arranged within the outer casing (filter box) of the filtering assembly.

This solution has the advantage of preventing inadvertent detachment of the filtering cartridge, should the required firmness of the connection no longer be guaranteed due to the wear of the hook means or the respective abutment means.

An aspect of the invention particularly provides for that said safety means may comprise at least one pair of locking bodies, each of which is positioned adjacent to a respective flexible fin of the hook means, so as to prevent the bending thereof towards the central axis of the second access port of the shaped shell.

This aspect of the invention has the advantage of providing a particularly simple and reliable solution for providing the anti-disengagement safety means.

BRIEF DESCRIPTION OF THE DRAWINGS

Further characteristics and advantages of the invention will be apparent from reading the description that follows provided by way of non-limiting example, with reference to the figures illustrated in the attached drawings.

FIG. 5 is the section V-V of FIG. 3 shown in enlarged scale.

FIG. 6 is an exploded view of the outer casing of the filtering assembly of FIG. 1.

FIG. 7 is a top view of a portion of the casing of FIG. 6 shown without the upper cover.

FIG. 8 is the section VIII-VIII of FIG. 7.

FIG. 9 is the section IX-IX of FIG. 7.

FIG. 10 is a perspective view of the filtering cartridge of the filtering assembly of FIG. 1.

FIG. 15 is the detail XV indicated in FIG. 14 shown in enlarged scale.

BEST WAY TO CARRYING OUT THE INVENTION

Figures 1, 3:
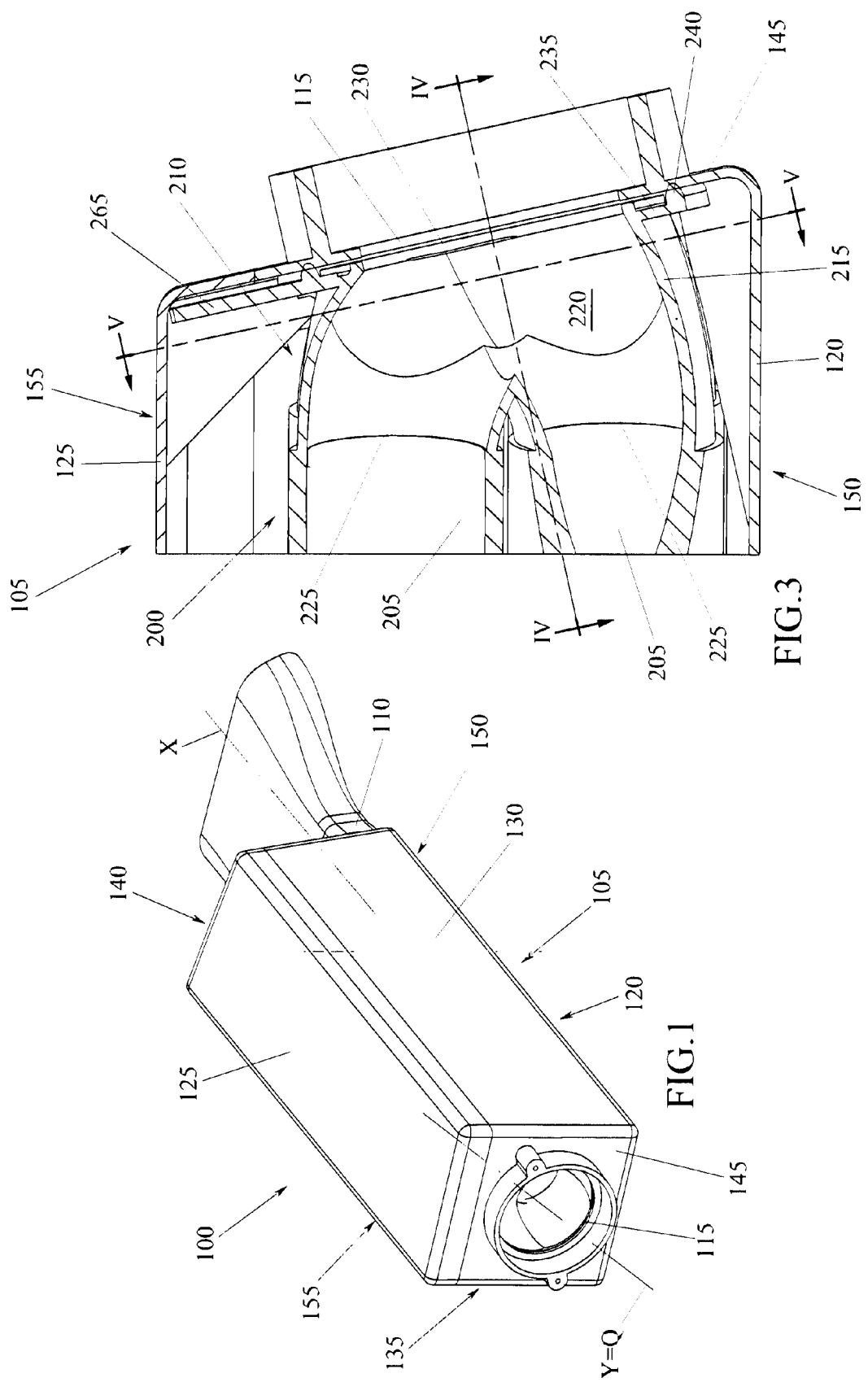
FIG. 1 is a perspective view of a filtering assembly according to the present invention.
FIG. 3 is the section III-Ill of FIG. 2 shown in enlarged scale.

A filtering assembly 100, adapted to purify an airflow from the solid particles possibly present in suspension is illustrated in FIG. 1. More in particular, the filtering assembly 100 is intended to be positioned along an intake conduit of an internal combustion engine, so as to filter the comburent air that is suctioned into the combustion chambers of the engine.

The filtering assembly 100 comprises an outer casing 105, conventionally referred to as filter box, which may be generally made of plastic material. The outer casing 105 delimits an internal volume and it is provided with an inlet 110 for the air to be filtered and an outlet 115 for the filtered air, both communicating with said internal volume. The inlet 110 is intended to be in communication with the external environment, while the outlet 115 is adapted to be in communication with the engine combustion chambers, usually through an intake manifold.

Figure 2:
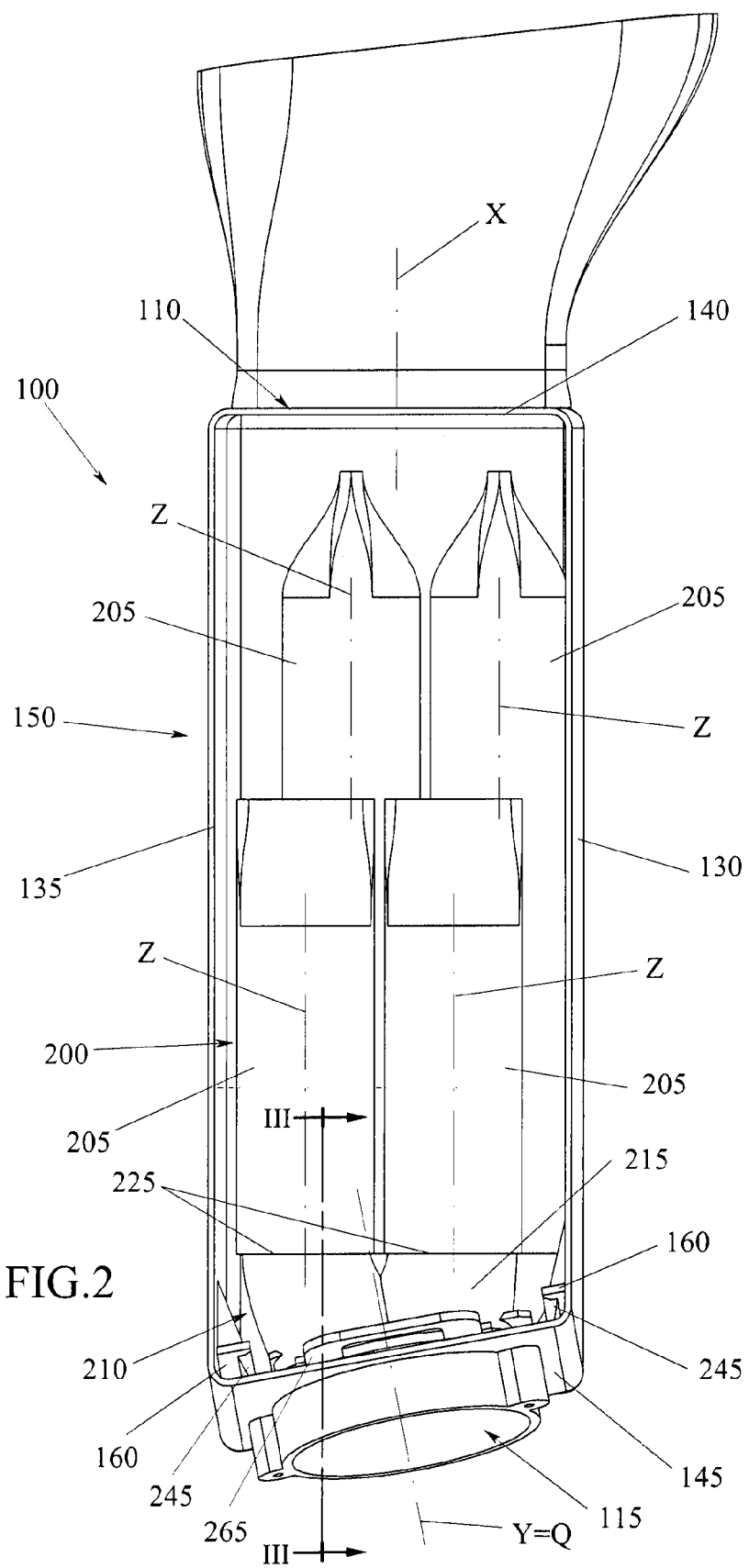
FIG. 2 is a top view of the filtering assembly of FIG. 1 shown without the upper cover.

The outer casing 105 is generally polyhedron-shaped, an extended polyhedron in this case. Said polyhedron has a lower base 120 and an upper base 125, parallel and both quadrilateral, which are connected by four edges, among which two lateral edges 130 and 135 oriented length-wise, and two end edges 140 and 145 oriented transversely. The inlet 110 is obtained in the end edge 140, while the outlet 115 is obtained in the opposite end edge 145. As observable in FIG. 6, the inlet 110 has a substantially rectangular cross-section with central axis X orthogonal to the end edge 140. The outlet 115 has a substantially circular cross-section with central axis Y orthogonal to the end edge 145. As observable in FIG. 2, the end edges 140 and 145 are not perfectly parallel to each other, thus the central axis Y of the outlet 115 is inclined with respect to the central axis X of the inlet 110.

Returning to FIG. 6, the outer casing 105 comprises a lower body 150, vat-shaped, which defines the lower base 120 and the four edges 130, 135, 140 and 145. The lower body 150 is closed by an upper cover 155 which defines the upper base 125. The upper cover 155 is fixed to the lower body 150 through releasable fixing means, in this case through a fitting system. Thus, the upper cover 155 can be separated by the lower body 150 for allowing access to the internal volume of the outer casing 105.

As illustrated in FIGS. 7 to 9, in proximity of the outlet 115, the lower body 150 is internally provided by thin flat brackets 160, each of which derives and projects from the inner surface of a respective lateral edge 130 and 135, and it is stiffened by a series of ribs. Said brackets 160 are coplanar with respect to each other and parallel to the end edge 145 in which the outlet 115 is obtained.

Once again returning to FIG. 6, the upper cover 155 has a pair of stems 165 which is derived and projects from the inner face of the upper cover 155. When the upper cover 155 is fixed to the lower body 150, the stems 165 are extended in the internal volume of the outer casing 105, parallel to the brackets 160 (also see FIG. 5).

Figure 4:
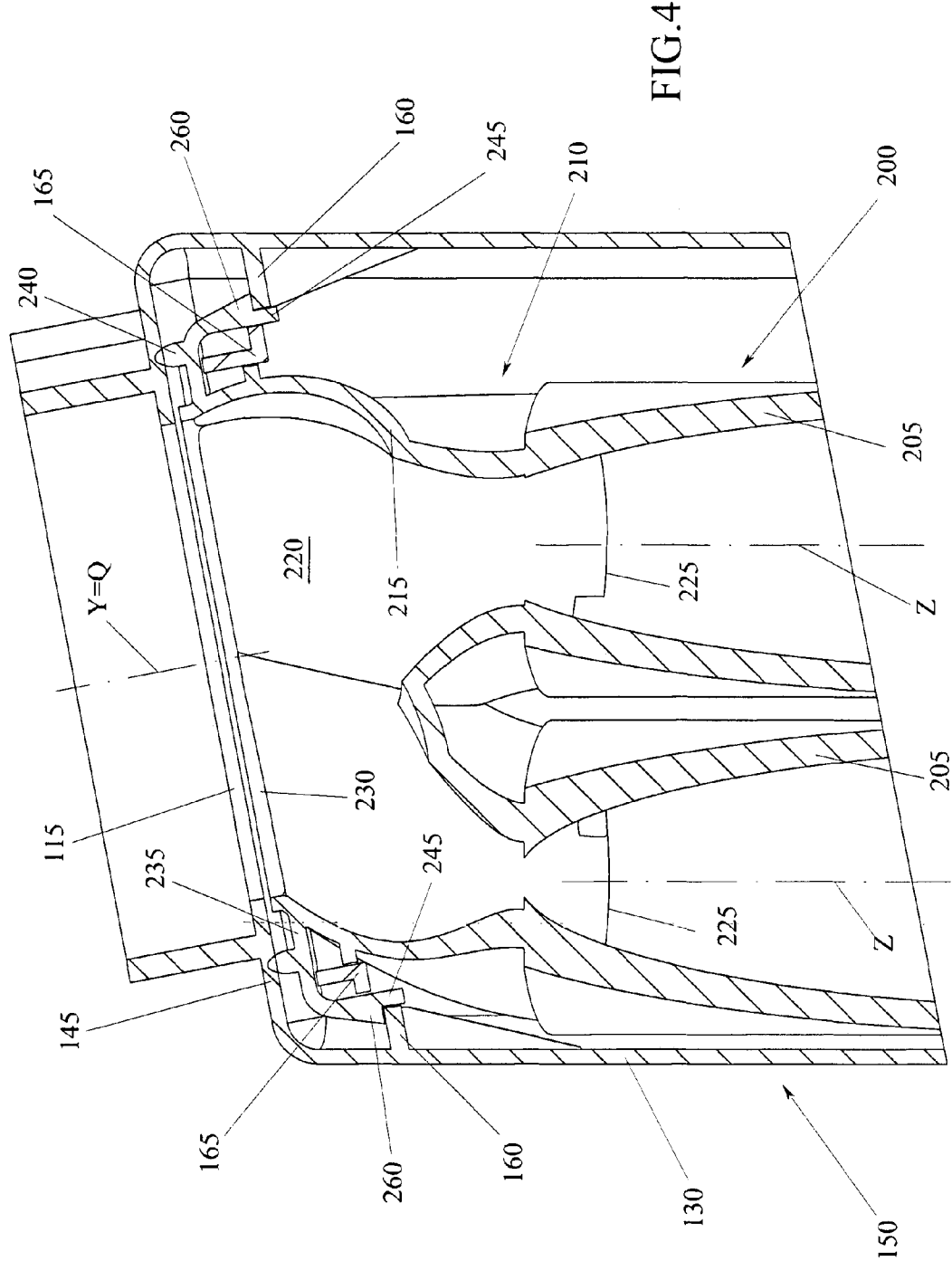
FIG. 4 is the section IV-IV of FIG. 3 shown in enlarged scale.
Figure 12:
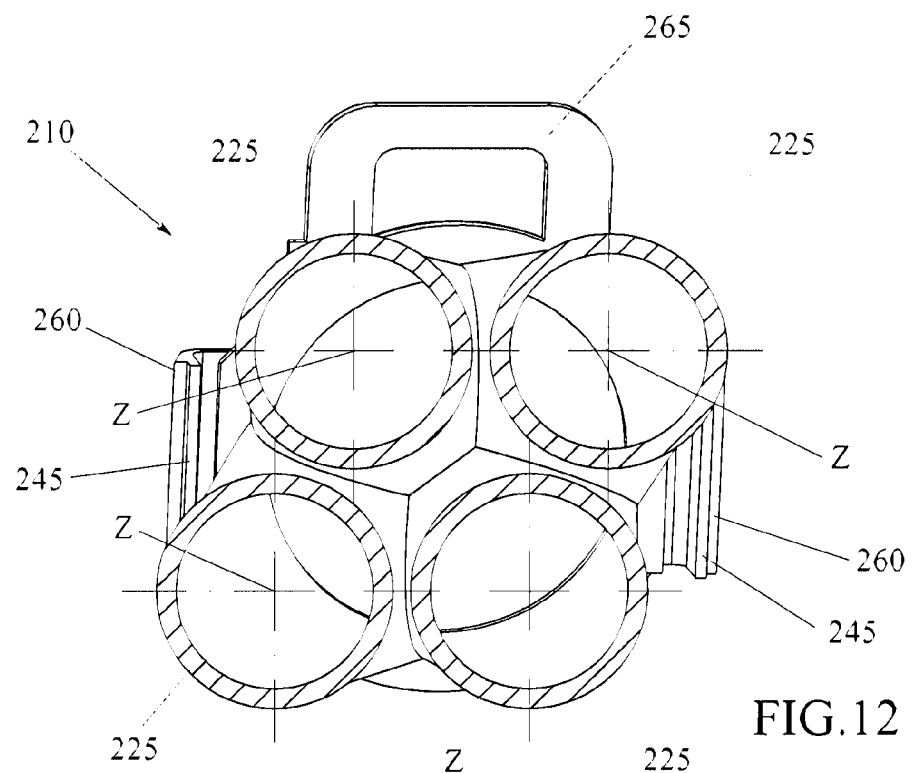
FIG. 12 is the section XII-XII of FIG. 11.
Figure 11:
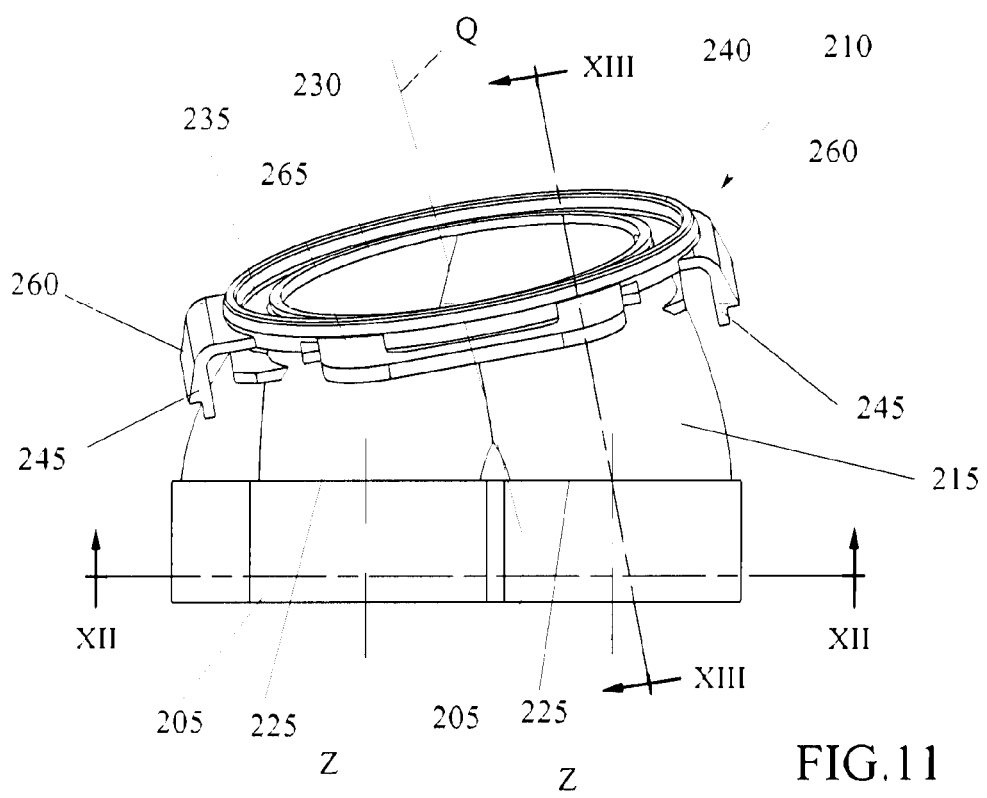
FIG. 11 is a top view of a portion of the filtering cartridge of FIG. 10.
Figure 13:
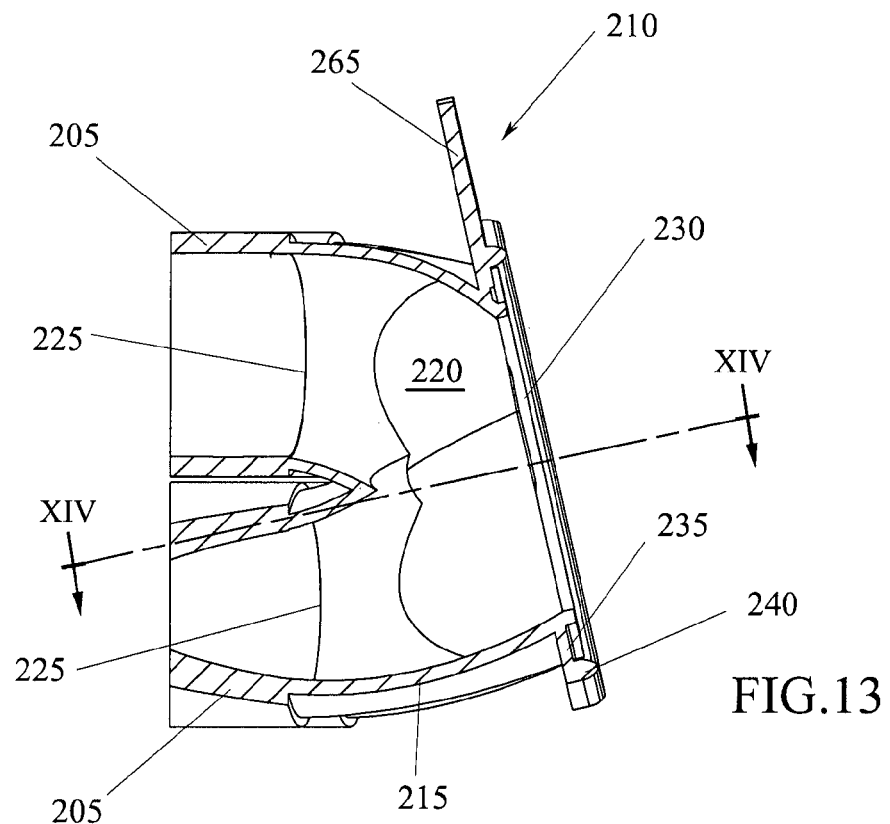
FIG. 13 is the section XIII-XIII of FIG. 11.
Figure 14:
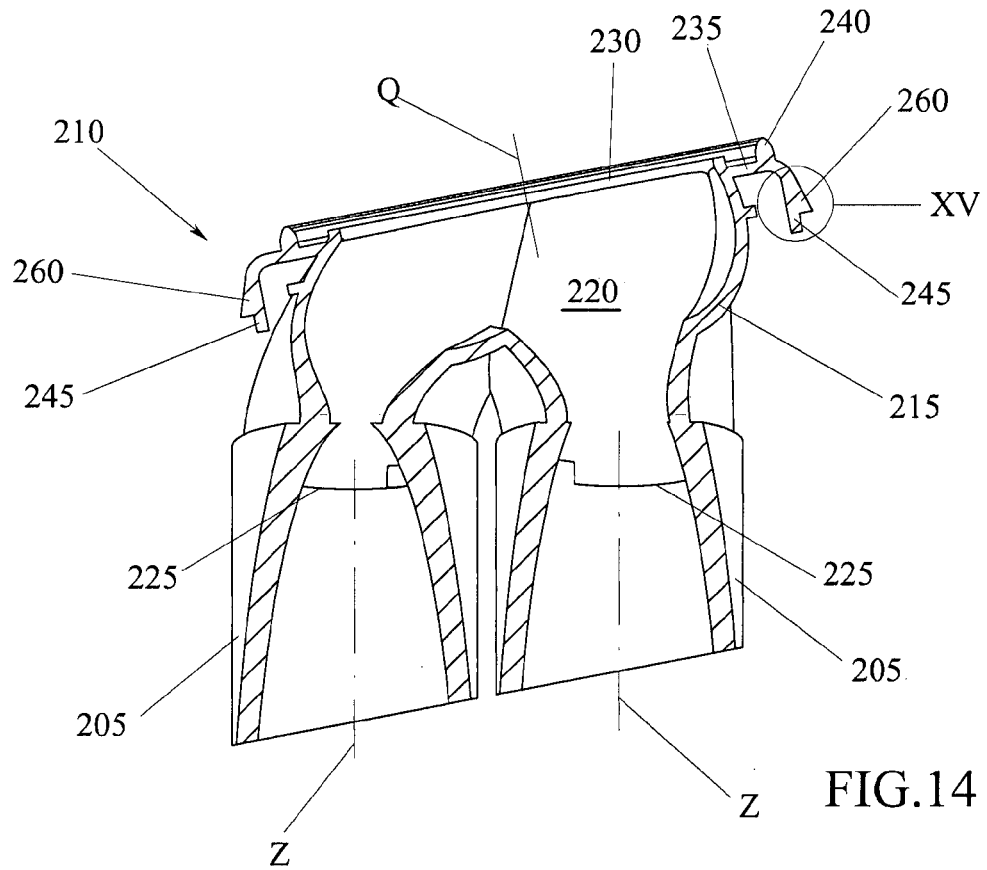
FIG. 14 is the section XIV-XIV of FIG. 13.

As illustrated in FIG. 4, the stems 165 have a substantially L-shaped cross-section and are interposed—in plan view—between the brackets 160, substantially aligned with the latter. More in particular, each stem 165 is positioned beside a respective bracket 160. In addition, each stem 165 is suitably spaced both by the adjacent bracket 160 and by the end edge 145. The filtering assembly 100 further comprises a filtering cartridge 200 adapted to be installed within the outer casing 105, which is illustrated in FIG. 10. The filtering cartridge 200 schematically comprises a plurality of filtering elements 205 and a manifold element 210 generally adapted to support said filtering elements 205.

The filtering elements 205 are generally configured as cylindrical bodies. In the shown example, each filtering element 205 is configured in particular as a cylindrical tubular body closed at one end and open at the opposite end. Generally, the filtering elements 205 can be made of any porous material which is permeable to air but capable of withholding the solid particles in suspension. In the shown example, each filtering element 205 is obtained using non-woven fabric of polymeric fibres.

The manifold element 210 comprises a shaped shell 215, which can be made of plastic material, for example by means of a moulding method. The shaped shell 215 delimits an internal volume 220 and it is provided with a plurality of access ports communicating with said internal volume 220, among which four inlet ports 225 and an outlet port 230 (also see FIGS. 11 to 14).

Each inlet port 225 is substantially configured as a cylindrical sleeve, on which there is coaxially head-fixed the open end of a respective filtering element 205. Thus, each inlet port 225 is occluded by the relative filtering element 205 and also serves as support for the latter. The open end of the filtering element 205 can be stably fixed to the inlet port 225 by bonding, through a hot-welding method or by means of any other system capable of guaranteeing the airtight sealing of the connection. Possibly, the open end of the filtering element 205 could be partly fitted in the or within the sleeve which defines the relative inlet port 225.

In the illustrated example, the inlet ports 225 are all provided on the same side of the shaped shell 215 and have central axes Z parallel to each other, so that the filtering elements 205 are also parallel and mutually adjacent to each other. In particular, the outlet ports 225 are arranged in pairs—superimposed and slightly staggered (see FIG. 12)—so as to maintain the assembly of filtering elements 205 as compact as possible.

The outlet port 230 is substantially obtained on the opposite side of the shaped shell 215 with respect to the inlet ports 225, where it has a circular cross-section with a central axis Q inclined with respect to the central axes Z of the inlet ports 225. The diameter of the outlet port 230 is larger with respect to that of the inlet ports 225 and it is substantially equivalent to the diameter of the outlet 115 of the outer casing 105.

The outlet port 230 is delimited by a flat annular flange 235, which is obtained as a monolithic body with the shaped shell 215 and lies in a plane orthogonal to the central axis Q of the outlet port 230. On the outer face of the flat flange 235 there is fixed an annular gasket 240, which completely surrounds the outlet port 230. The annular gasket 240 is preferably obtained using EPDM (Ethylene-Propylene Diene Monomer), but it can also be obtained using other materials generally having the characteristics of rubber. The annular gasket 240 can be obtained as a separate component and be fixed to the flange 235 by bonding, shape coupling or any other suitable system. Alternatively, the annular gasket 240 can be obtained in a single piece with shaped shell 215, for example through a co-moulding method.

The manifold element 210 is further provided with a pair of hook fins 245, which are obtained in a single body with the shaped shell 215 and they are derived cantilevered from the outer perimeter edge of the flat flange 235. Said hook fins 245 are identical to each other and symmetrically arranged on sides diametrically opposite with respect to the central axis Q of the outlet port 230. In particular, each hook fin 245 is oriented orthogonally with respect to the flat flange 235 and develops therefrom towards the inlet ports 225. Due to this configuration, the hook fins 245 are adapted to elastically bend in the radial direction with respect to the central axis Q of the outlet port 230, approaching each other. Each hook fin is also provided with a tooth 260 radially projecting outwards. The tooth 260 is tapered towards the flat flange 235 and defines a notch with the free end of the respective hook fin 245. The notches defined by the teeth 260 are substantially coplanar to each other. It should be observed that the distance of said notches from the top of the annular gasket 240, measured in the direction of the central axis Q of the outlet port 230, is greater with respect to the distance separating the end face 145 of the outer casing 105 from brackets 160.

Even more in detail, each hook fin 245 and the relative projecting tooth 260 are globally defined by a body substantially having the shape of a straight prism, which develops along a straight longitudinal axis and perpendicular to the central axis Q of the output port 230. In practice, the transverse section of each hook fin 245 and the relative projecting tooth 260, carried out with respect to the respective longitudinal axis, is substantially constant over the entire length and it has flat lateral faces. The longitudinal axis of each hook fin 245 and the relative projecting tooth 260 is parallel to the longitudinal axis of the other hook fin 245 and the relative projecting tooth 260, and both are perpendicular to the central axis Q of the output port 230.

As illustrated in FIG. 15, each tooth 260 is substantially shaped to form a wedge, which comprises a base flat surface 261 and a flat lateral surface 262. The base surface 261 is perpendicular to the central axis Q of the output port 230 and it is faced towards the filtering elements 205, while the lateral surface 262 is laterally faced towards the external, and it is inclined starting is from the external edge of the base surface 261 towards the flange 235 and towards the central axis Q of the output port 230. The base surface 261 of each tooth 260 is substantially coplanar to the base surface 261 of the other tooth 260. In the illustrated example, the base surface 261 of each tooth 260 projects cantilevered from a flat surface 263 of an extension of the relative fin 245, which projects towards the filtering elements 205. Said flat surface 263 is parallel to the central axis Q of the output port 230 and it is radially faced towards the external. The flat surface 263 of each hook fin 245 is parallel to the flat surface 263 of the other hook fin 245. Thus, each base surface 261 and the relative flat surface 263 are perpendicular with respect to each other and they delimit a dihedral which defines the previously mentioned notch. Such dihedral is entirely open, i.e. it is delimited solely by the base surface 261 and by the flat surface 263, while it is open on all the other sides.

Lastly, the manifold element 210 comprises a handle 265, which is obtained in a single piece with the shaped shell 215 and it is also derived from the outer perimeter edge of the flat flange 235. The handle 265 can be gripped by an operator to simplify the handling of the filtering cartridge 200 during the mounting and demounting thereof with respect to the outer casing 105 of the filtering assembly 100.

Regarding this, the mounting of the filtering cartridge 200 provides for removing the upper cover 155 of the outer casing 105 and thus inserting the filtering cartridge 200 into the lower body 150. The filtering cartridge 200 is oriented so that the outlet port 230 of the manifold element 210 is aligned with the outlet 115 of the outer casing 105, that the flat flange 235 faces the end edge 145, and that each of the hook fins 245 is aligned to a respective bracket 160. It should be observed that the inclination between the central axis Q of the outlet port 230 and the central axes Z of the inlet ports 225 of the manifold element 210 is selected so that, when the filtering cartridge 200 is in the aforementioned position, the filtering elements 205 are oriented parallel to the central axis X of the inlet 110, thus optimally occupying the space available in the outer casing 105.

After this positioning stage, the filtering cartridge 200 is displaced so as to progressively approach the flat flange 235 of the manifold element 210 to the end edge 145 of the outer casing 105. Such approaching actually occurs along the direction defined by the central axis Q of the output port 230. During this approaching, the projecting teeth 260 of the hook fins 245 are in contact with the brackets 160 and thus they are progressively pushed by the latter towards the central axis Q of the outlet port 230, bending elastically. In particular, the hook fins 245 bend radially towards the central axis Q as the free edge of the brackets 160 slides at contact with the inclined lateral surfaces 262 of the projecting teeth 260. When the projecting teeth 260 exceed the brackets 160, the hook fins 245 snap-return to the undeformed configuration thereof, thus preventing the filtering cartridge 200 from receding. In particular, the free edge of each flat bracket 160 is received within the dihedral or notch defined by the flat surface 261 and 263 of a respective hook fin 245. Thus, the flat surfaces 261 are faced to the flat surfaces of the brackets 160, which are faced towards the end edge 145 of the external casing 105, preventing the filtering cartridge 200 from receding in the direction of the axis Q. Given that the distance between the end edge 145 and the brackets 160 is smaller than the distance between the notch defined by the projecting teeth 260 (i.e. the surfaces 261) and the annular gasket 240, it occurs that upon reaching the snapping, the filtering cartridge 200 is entirely locked with respect to the outer casing 105 and the annular gasket 240 is compressed between the flat flange 235 and the end face 145, thus guaranteeing the airtight sealing of the connection between the outlet port 230 of the manifold element 210 and the outlet 115 of the outer casing 105.

After terminating this stage, the lower body 150 of the outer casing 105 is closed by the upper cover 155. As illustrated in FIGS. 4 and 5, by applying the upper cover 155, each stem 165 fits behind a respective hook fin 245, i.e. each hook fin 245 is interposed between the adjacent bracket 160 and a respective stem 165 of the upper cover 155. Thus, as long as the upper cover 155 is maintained closed, the stems 165 serve as safety means which prevent the hook fins 245 from bending and thus freeing the hooking between the filtering cartridge 200 and the outer casing 105. Regarding this, it should be observed that the stems 165 are positioned and dimensioned so as to be in direct contact with the corresponding hook fin 245, or be spaced from the latter by an amount smaller than the dimension of the notch defined by the projecting tooth 260. The stems 165 are also positioned and dimensioned so as to always be at least slightly spaced from the flat flange 235. Thus, the annular gasket 240 is not pusher against the end edge 145 by the stems 165, but only by the hook fins 245 which rest against the brackets 160.

After completing the assembling described above, the filtering cartridge 200 divides the internal volume of the outer casing 105 into two separate chambers, among which a first chamber defined outside the filtering elements 205, which is in communication with the inlet 110, and a second chamber defined inside the filtering elements 205 and the shaped shell 215, which is in communication with the outlet 115 through the outlet port 230. Thus, the air flowing from the inlet 110 towards the outlet 115 is forced to pass through the filtering elements 205, which withhold the solid particles possibly carried in suspension.

When the filtering elements 205 are entirely clogged, the filtering cartridge 200 can be removed and replaced with a new one. The removal of the filtering cartridge 200 very simply provides for removing the upper cover 155 of the outer casing 105, so as to also simultaneously remove the stems 165, and subsequently grip the handle 265 and extract the filtering cartridge 200 moving it in the perpendicular direction with respect to the central axis Q of the outlet port 230, i.e. by sliding the hook fins 245 on the brackets 160 until they are slipped off from above. This lateral slipping off is allowed due to the fact that the surfaces 261 and 263 of the hook fins 245 define an open dihedral, which does not hinder the sliding of the filtering cartridge 200 on the plane of the brackets 160.

Furthermore, the surfaces 263 of the hook fins 245, facing the straight edge of the flat brackets 160, also have the advantage of guiding the aforementioned sliding solely in the direction that allows removing the coupling and the extraction of the filtering cartridge 200. In conclusion, it should be observed that the installation of the filtering assembly 100 could also be inverted with respect to what has been described previously. In other words, the outlet 115 could be used as inlet for the air to be filtered and the inlet 110 could be used as the outlet of the filtered air. In this case, the outlet port 230 of the manifold element 210 would become an inlet port, while the inlet ports 225 would become the outlet ports. The air would thus be forced to pass through the filtering elements 205 in the inwards-outwards radial direction.

Obviously the filtering assembly 100, the filtering cartridge 200 and the manifold element 210 may be subjected—by a man skilled in the art—to numerous technical/application modifications, without departing from the scope of protection of the invention as claimed below.

REFERENCES 100 filtering assembly
105 outer casing
110 inlet
115 outlet
120 lower base
125 upper base
130 lateral edge
135 lateral edge
140 end edge
145 end edge
150 lower body
155 upper cover
160 brackets
165 stem
200 filtering cartridge
205 filtering element
210 manifold element
215 shaped shell
220 internal volume
225 inlet port
230 outlet port
235 flat flange
240 annular gasket
245 hook fins
260 projecting tooth
261 base surface
262 lateral surface
263 flat surface
265 handle
X inlet central axis
Y outlet central axis
Z inlet ports central axis
Q outlet port central axis

The invention claimed is:

1. A manifold element (210) comprising a shaped shell (215) having an internal volume (220) and a plurality of access ports (225, 230) communicating with said internal volume,
   wherein said plurality of access ports (225, 230) of the shaped shell (215) comprise a plurality of first access ports (225) and at least one second access port (230),
   wherein each of said first access ports (225) is adapted to be coupled with a respective filtering material element (205) so as to support the filtering material element (205) and be occluded thereby
   wherein the filtering material elements (205) are disposed externally of the internal volume of the shaped shell (215),
   wherein said shaped shell (215) is provided with coupling means (245), which are adapted to attain a snap-coupling with corresponding abutment elements (160) arranged within a casing (105) adapted to house the manifold element (210) and the filtering material elements (210), and,
   wherein said coupling means comprise a pair of flexible fins (245) positioned on diametrically opposite sides with respect to a central axis (Q) of the second access port (230), which are bendable in a radial direction with respect to said central axis (Q), each flexible fin (245) being provided for at least one tooth (260) projecting radially towards the external.

2. A manifold element (210) according to claim 1, wherein said flexible fins (245) and the relative projecting teeth (260) are configured so as to allow the snap coupling with the abutment elements (160), following a relative movement in a preset coupling direction (Q), and so as to allow releasing said coupling, through a relative movement in a direction orthogonal to said coupling direction (Q).

3. A manifold element (210) according to claim 1, wherein the second access port (230) is on an opposite side of the shaped shell (215) with respect to the first access ports (225).

4. A manifold element (210) according to claim 1, wherein said flexible fins (245) are obtained in a single body with the shaped shell (215) and are derived cantilevered from an outer perimeter edge of a flat flange (235), which is obtained as a monolithic body with the shaped shell (215) and lies in a plane orthogonal to a central axis (Q) of the outlet port (230).

5. A manifold element (210) according to claim 4, wherein the tooth (260) of each flexible fin (245) is radially projecting outwards and is tapered towards the flat flange (235), thereby defining a notch (261) with a free end of the respective flexible fin (245).

6. A manifold element (210) according to claim 5, wherein the notches (261) defined by the teeth (260) are substantially coplanar to each other.

7. A manifold element (210) according to claim 1, wherein the second access port (230) of the shaped shell (215) has a central axis (X) inclined with respect to central axes (Y) of the first access ports (225).

8. A manifold element (210) according to claim 1, further comprising an annular gasket (240) surrounding said second access port (230).

9. A manifold element (210) according to claim 8, wherein the annular gasket (240) is fixed on an outer surface of a flat flange (235), which is obtained as a monolithic body with the shaped shell (215) and lies in a plane orthogonal to a central axis (Q) of the outlet port (230).

10. A manifold element (210) according to claim 8, wherein said annular gasket (240) is obtained in a single piece with the shaped shell (215).

11. A manifold element (210) according to claim 1, further comprising a handle (265).

12. A filtering cartridge (200) comprising;
    a manifold element (210) and
    a plurality of filtering material elements (205),
    wherein the manifold element (210) comprises a shaped shell (215) having an internal volume (220) and a plurality of access ports (225, 230) communicating with said internal volume,
    wherein said access ports (225, 230) of the shaped shell (215) comprise a plurality of first access ports (225) and at least one second access port (230), wherein each one of said filtering material element (210) is coupled to one of the first access ports (225) of the shaped shell (215) so as to occlude it, wherein the filtering material elements (205) are disposed externally of the internal volume of the shaped shell (215), wherein said shaped shell (215) is provided with coupling means (245), which are adapted to attain a snap-coupling with corresponding abutment elements (160) arranged within a casing (105) adapted to house the manifold element (210) and the filtering material elements (210), and wherein said coupling means comprise a pair of flexible fins (245) positioned on diametrically opposite sides with respect to a central axis (Q) of the second access port (230), which are bendable in a radial direction with respect to said central axis (Q), each flexible fin (245) being provided for at least one tooth (260) projecting radially towards the external.

13. A filtering cartridge (200) according to claim 12, wherein each of said filtering material elements (205) has a tubular shape closed at one end.

14. A filtering assembly (100) comprising:
an outer casing (105) provided with an inlet (110) for a fluid to be filtered and an outlet (115) for the filtered fluid, and
a filtering cartridge (200) is arranged inside the outer casing (105) to divide an internal volume of said casing (105) into two separate chambers, among which a first chamber communicating with the inlet (110) of the fluid to be filtered and a second chamber communicating with the outlet (115) of the filtered fluid
wherein the filtering cartridge (200) comprises:
a manifold element (210), and
a plurality of filtering material elements (205),
wherein the manifold element (210) comprises a shaped shell (215) having an internal volume (220) and a plurality of access ports (225, 230) communicating with said internal volume,
wherein said access ports (225, 230) of the shaped shell (215) comprise a plurality of first access ports (225) and at least one second access port (230),
wherein each one of said filtering material element (210) is coupled to one of the first access ports (225) of the shaped shell (215) so as to occlude it,
wherein the filtering material elements (205) are disposed externally of the internal volume of the shaped shell (215),
wherein said shaped shell (215) is provided with coupling means (245), which are adapted to attain a snap-coupling with corresponding abutment elements (160) arranged within the outer casing (105), and
wherein said coupling means comprise a pair of flexible fins (245) positioned on diametrically opposite sides with respect to a central axis (Q) of the second access port (230), which are bendable in a radial direction with respect to said central axis (Q), each flexible fin (245) being provided for at least one tooth (260) projecting radially towards the external.

15. A filtering assembly (100) according to claim 14, wherein said outer casing (105) comprises a removable cover (155) for introducing and removing the filtering cartridge (200).

16. A filtering assembly (100) according to claim 15, wherein said removable cover comprises safety means (165) adapted to maintain hook means (245) of the manifold element (210) coupled with corresponding abutment elements (160) arranged within the outer casing (105) of the filtering assembly (100).

17. A filtering assembly (100) according to claim 16, wherein said safety means comprise at least one pair of locking bodies (165), each of which is positioned adjacent to a respective flexible fin (245) of said hook means, so as to prevent the bending thereof towards the central axis (Q) of the second access port (230) of the shaped shell (215).

18. A filtering assembly (100) according to claim 14, wherein the flexible fins (245) of the manifold element and the relative projecting teeth (260) are configured so as to allow a snap coupling with the abutment elements (160) of the casing (105), following a relative movement in a preset coupling direction (Q), and so as to allow releasing said coupling, through a relative movement in a direction orthogonal to said coupling direction (Q).

* * * * *